(12) United States Patent
Graepel et al.

(10) Patent No.: US 8,094,928 B2
(45) Date of Patent: Jan. 10, 2012

(54) STEREO VIDEO FOR GAMING

(75) Inventors: Thore K H Graepel, Cambridge (GB); Andrew Blake, Stapleford (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 11/272,950

(22) Filed: Nov. 14, 2005

(65) Prior Publication Data
US 2007/0110298 A1 May 17, 2007

(51) Int. Cl.
G06K 9/00 (2006.01)
G06K 9/34 (2006.01)
G06T 15/00 (2006.01)
G09G 5/00 (2006.01)

(52) U.S. Cl. ......... 382/154; 382/173; 345/419; 345/619

(58) Field of Classification Search ............... 382/173, 382/154; 345/419, 619
See application file for complete search history.

(56) References Cited

U.S. PATENT DOCUMENTS

| | | | |
|---|---|---|---|
| 6,806,898 B1 | 10/2004 | Toyama et al. | |
| 6,873,723 B1 | 3/2005 | Aucsmith et al. | |
| 7,164,784 B2 * | 1/2007 | Beardsley | 382/154 |
| 2004/0151366 A1 * | 8/2004 | Nefian et al. | 382/154 |
| 2004/0239670 A1 * | 12/2004 | Marks | 345/419 |
| 2004/0252862 A1 * | 12/2004 | Camus et al. | 382/104 |
| 2004/0258279 A1 | 12/2004 | Hirvonen et al. | |
| 2009/0073170 A1 * | 3/2009 | Berretty et al. | 345/427 |

FOREIGN PATENT DOCUMENTS

| | | |
|---|---|---|
| EP | 1072018 | 10/1999 |
| WO | 0113645 A2 | 2/2001 |
| WO | 0207839 A2 | 1/2002 |

OTHER PUBLICATIONS

Konrad, T.—"Navigating in Virtual Environments using a Vision-based Interface"—ACM—2004, pp. 113-120.*
Mittal, A.—"M2Tracker: A Multi-View Approach to Segmenting and Tracking People in a Cluttered Scene"—Computer Vision—2003.*
Criminisi, A.—"The SPS Algorithm: Patching Figural Continuity and Transparency by Split-Patch Search"—IEEE—Jul. 2004.*
Hilton, et al; "3D Studio Production of Animated Actor Models"; Vision, Image and Signal Processing, IEE Proceedings; vol. 152, Aug. 4-5, 2005. pp. 481-490.
Kolmogorov, V. et al; "Bi-Layer Segmentation of Binocular Stereo Video"; Computer Vision and Pattern Recognition, 2005; In: IEEE Computer Society Conference; vol. 2, Jun. 20-25, 2005; pp. 407-414.
International Search Report; Korean Intellectual Property Office; Feb. 14, 2007.
Garcia, L. V., "MeetMe@CyberStage: Immersive Stereoscopic Tlepresence," 2001.

(Continued)

*Primary Examiner* — Jingee Wu
*Assistant Examiner* — Bernard Krasnic

(57) ABSTRACT

A real-time stereo video signal of a captured scene with a physical foreground object and a physical background is received. In real-time, a foreground/background separation algorithm is used on the real-time stereo video signal to identify pixels from the stereo video signal that represent the physical foreground object. A video sequence is produced by rendering a 3d virtual reality based on the identified pixels of the physical foreground object.

27 Claims, 10 Drawing Sheets

OTHER PUBLICATIONS

Eisaku Hori, et al., "3D Input Interface via Hand Motion Using Stereo Camera System for Wearable PC Environment," Presented in Proceedings of MVA2002 (IAPR Workshop on Machine Vision Applications, Dec. 11-12, 2002, Nara, Japan), pp. 285-288.

Youngjung Suh, et al., "2.5D Video Avatar Augmentation for VRPhoto," ICAT 2002, Dec. 4-6, Tokyo, Japan.

Cordea, M.D., et al., "3D Head Pose Recovery for Interactive Virtual Reality Avatars," IEEE Instrumentation and Measurement Technology Conference, Budapest, Hungary, May 21-23, 2001.

Bahadori, S., et al., "A Stereo Vision System for 3D Reconstruction and Semi-Automatic Surveillance of Museum Areas," http://www.dis.uniromal.it/~iocchi/publications/iocchi-plt-aiia03.pdf.

Rajan, V., et al., "A Realistic Video Avatar System for Networked Virtual Environments," http://www.evl.uic.edu/aej/papers/IPT2002.pdf.

Morency, L.-P., et al., "From Conversational Tooltips to Grounded Discourse: Head Pose Tracking in Interactive Dialog Systems," ICMI'04, Oct. 13-15, 2004, State College, Pennsylvania, USA.

Sheriff, L., "MS boffins build real-time stereocam," The Register, 10th Jun. 2004, http://www.theregister.com/2004/06/10/3d_avatar/.

Ogi, T., et al., "Usage of Video Avatar Technology for Immersive Communication," First International Workshop on Language Understanding and Agents for Real Work Interaction, 2003, http://www.cl.cs.titech.ac.ip/sinpro/WS/2003.7.13/Ogi.pdf.

Tollmar, K., et al., "Gesture + Play: Full-Body Interaction for Virtual Environments," CHI 2003: New Horizons, CHI 2003, Apr. 5-10m, 2003, Ft. Lauderdale, Florida, USA.

Kleiner, M., et al., "Multi-viewpoint video capture for facial perception research," http://www.kyb.mpg.de/publications/pdfs/pdf3058.pdf.

"Projects Regarding Virtual Reality : Motion Capture for Avatar Construction in Interactive Virtual Environments", http://www.comp.mq.edu.au/undergrad/honours/projects/proposals/manolya.htm.

Chong, L., et al., "Video Stereoscopic Avatars for the CAVE™ Virtual Environments," http://zx81.isl.uiuc.edu/camilleg/ismar04.pdf.

Wren, C.R., et al., "Combining Audio and Video in Perceptive Spaces," M.I.T. Media Laboratory Perceptional Computing Section Technical Report No. 511, 1st International Workshop on Managing Interactions.

Triclops™ Software Development Kit (SDK) Technical Specification, Point Grey Research, http://www.ptgrey.com/products/triclopsSDK/triclops.pdf.

European Search Report Ref EP58192TE900kap, Application No. 06816854.1-2218 / 1960970 PCT/US2006040043. Mailed Feb. 3, 2009. 17 Pages.

Hilton, et al., "3-D Studio Production of Animated Actor Models", IEE Proceedings—Vision, Image and Signal Processing, vol. 152, Issue 4, Aug. 5, 2005. pp. 481-490.

Kolmogorov, et al., "Bi-Layer Segmentation of Binocular Stereo Video", IEEE Computer Society Conference on Computer Vision and Pattern Recognition, CVPR 2005. Jun. 20-25, 2005. 8 Pages.

Gordon, et al., "Background Estimation and Removal Based on Range and Color", cvpr, vol. 2, 1999 IEEE Computer Society Conference on Computer Vision and Pattern Recognition (CVPR'99)—vol. 2. 6 Pages.

Yonemoto, et al., "Vision-based 3D Direct Manipulation Interface for Smart Interaction", Proceedings 16th International Conference on Pattern Recognition, 2002. vol. 2, pp. 655-658.

European Search Report, EP 06 81 6854, by Scholz, Volker, Jan. 22, 2009.

Hilton A et al: "3-D studio production of animated actor models Visual media production" IEE Proceedings: Vision, Image and Signal Processing, Institution of Electrical Engineers, GB, vol. 152, No. 4, Aug. 5, 2005, pp. 481-490.

Gordon G et al: "Background estimation and removal based on range and color" 19990623-19990625, vol. 2, Jun. 23, 1999, pp. 459-464.

Yonemoto S et al: "Vision-based 3D direct manipulation interface for smart interaction" Pattern Recognition, 2002, Proceedings. 16th International Conference on Quebec City, Que., Canada Aug. 11-15, 2002, Los Alamitos, CA, USA, IEEE Comput. Soc., US, vol. 2, Aug. 11, 2002, pp. 655-658.

Zabih et al., "Non-parametric Local Transforms for Computing Visual Correspondence" In Proceedings of European Conference on Computer Vision, Stockholm, Sweden, May 1994, pp. 151-158 http://www.tyzx.com/PDFs/census.pdf.

Office Action for European Application No. 06816854.1-2218 dated Sep. 29, 2009.

Office Action cited in related Chinese Application No. 200680042234.6 dated Mar. 3, 2010.

Office Action cited in related European Application No. 06816854.1-2218 dated Apr. 8, 2009.

Office Action cited in related European Application No. 06816854.1-2218 dated May 11, 2010.

"Integrated person tracking using stereo, color, and pattern detection", T. Darrell, G. Gordon, M. Harville and J. Woodfill, Proceedings of the 1998 IEEE Computer Society Conference on Computer Vision and Pattern Recognition, CVPR '98, Santa Barbara, CA, Jun. 23-25, 1998. [IEEE Computer Society Conference on Computer fision and Pattern Recognition], Los Alamitos, CA.: IE, vol. CONF. 17, Jun. 23, 1998, pp. 601-608.

"Xbox", Anonymous, Wikipedia, Oct. 31, 2005, pp. 1-10, Retrieved from the Internet: URL: http://en.wikipedia.org/w/index.php?title=Xbox&oldid=27003388 on Apr. 29, 2010.

European Office Action in Related Case Application No. 06816854.1 Dated Jan. 5, 2011.

Search Report in Related Case Application No. PCT/US2006040043 Dated Feb. 14, 2007.

Chinese Office Action cited in Chinese Application No. 200680042234.6 dated Jun. 22, 2011.

Int. Preliminary Report on Patentability cited in PCT Application No. PCT/US2006/040043 dated May 22, 2008.

Bahadori, S., et al., "A Stereo Vision System for 3D Reconstruction and Semi-Automatic Surveillance of Museum Areas," http://www.dis.uniromal.it/~iocchi/publications/iocchi-plt-aiia03.pdf, (2003).

Rajan, V., et al., "A Realistic Video Avatar System for Networked Virtual Environments," http://www.evl.uic.edu/aej/papers/IPT2002.pdf, (2002).

Kleiner, M., et al., "Multi-viewpoint video capture for facial perception research," http://www.kyb.mpg.de/publications/pdfs/pdf3058.pdf, (2004).

"Projects Regarding Virtual Reality : Motion Capture for Avatar Construction in Interactive Virtual Environments", http://www.comp.mq.edu.au/undergrad/honours/projects/proposals/manolya.htm, (Nov. 2005).

Chong, L., et al., "Video Stereoscopic Avatars for the CAVE™ Virtual Environments," http://zx81.isl.uiuc.edu/camilleg/ismar04.pdf, (2004).

Wren, C.R., et al., "Combining Audio and Video in Perceptive Spaces," M.I.T. Media Laboratory Perceptional Computing Section Technical Report No. 511, 1st International Workshop on Managing Interactions (1999).

Triclops™ Software Development Kit (SDK) Technical Specification, Point Grey Research, http://www.ptgrey.com/products/triclopsSDK/triclops.pdf, (Feb. 2004).

* cited by examiner

STEREO VIDEO FOR GAMING

BACKGROUND

Three dimensional (3d) graphics, in particular, simulated 3d realms or worlds, sometimes called 3d virtual reality, is a well known area of computer graphics, which typically involves rendering two dimensional images of 3d models and scenery in a 3d coordinate space. Most modern game consoles are designed specifically to be able to process 3d graphics in real-time, and many games for game consoles are based on a simulated 3d or virtual reality.

Game consoles are usually operated using game controllers, such as joysticks, button pads, and so on. For many players, significant time must be spent before a game control can be used proficiently. For lack of dexterity, many people do not regularly use a game console. Although game consoles have become powerful and can process a high level of control input from a user, it is difficult to provide a high level of control input using typical game controllers such as a touchpads, joysticks, mice, etc. Furthermore, game controllers are often not physically operated in a manner that meets a user's mental model or intuitive understanding of a game. In other words, a 3d game may involve causing an avatar to run, jump, hold different objects, shoot, duck, etc., perhaps simultaneously. However, a game controller can usually only output one or a few input signals at one time, and hands are not efficient at simultaneously controlling different types of actions, such as simultaneously moving an avatar, picking up an object, aiming, and so on.

Game consoles have also been limited in the type of imagery that they display. Typically, the graphics displayed by a game console are generated internally by a game or are provided in advance. For example, the images for animating a sprite may be part of a game's embedded content or program data. Real-time captured video of objects has not been inserted or mapped into 3d virtual reality.

SUMMARY

The following summary is included only to introduce some concepts discussed in the Detailed Description below. This summary is not comprehensive and is not intended to delineate the scope of the claimed subject matter, which is set forth by the claims presented at the end.

A real-time stereo video signal of a captured scene with a physical foreground object and a physical background is received. In real-time, a foreground/background separation algorithm is used on the real-time stereo video signal to identify pixels from the stereo video signal that represent the physical object. A video sequence is produced by rendering a 3d virtual reality based on the identified pixels of the physical foreground object.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

DETAILED DESCRIPTION

Stereo cameras and algorithms for processing stereo video data have progressed to the point where it possible to reliably acquire certain image information about captured objects in real time. A number of publications may be consulted. For example, "Bi-layer segmentation of binocular stereo video" (Vladimir Kolmogorov, Antonio Criminisi, Andrew Blake, Geoffrey Cross, Carsten Rother. 2005 San Diego, Calif., US Proc. IEEE Computer Vision and Pattern Recognition) discusses techniques for separating foreground objects from their background by fusing color/contrast analysis with stereo pattern matching. Regarding basic stereo matching, see also Y. Ohta and T. Kanade, Stereo by intra- and inter-scan line search using dynamic programming, IEEE Trans. on PAMI, 7(2), 1985; I. J. Cox, S. L. Hingorani, and S. B. Rao, A maximum likelihood stereo algorithm, CVIU, 63(3):542-567, 1996; D. Scharstein and R. Szeliski, A taxonomy and evaluation of dense two-frame stereo correspondence algorithms, IJCV, 47(1-3), 2002. Regarding dealing with occlusion on object boundaries, see P. N. Belhumeur, A Bayesian-approach to binocular stereopsis, Int. J. Computer Vision, 19(3):237-260, August 1996; D. Geiger, B. Ladendorf, and A. Yuille, Occlusions and binocular stereo, Int. J. Computer Vision, 14:211-226, 1995; and A. Criminisi, J. Shotton, A. Blake, and P. H. S. Torr, Gaze manipulation for one to one teleconferencing, In Proc. ICCV, 2003.

In sum, stereo video processing algorithms can, in real time, accurately and robustly separate objects in the foreground of a captured scene from the background of the scene. A stereo camera signal can be processed to obtain information such as the depth or distance of an object from the camera, the depth of pixels in an object's image, the identity of an object, an image of the object with the background cleanly removed regardless of the background's color or distance, the orientation of an object, and so on. In embodiments described below, information obtained by processing a stereo video signal is used by a game console or 3d graphics system.

Figure 1:
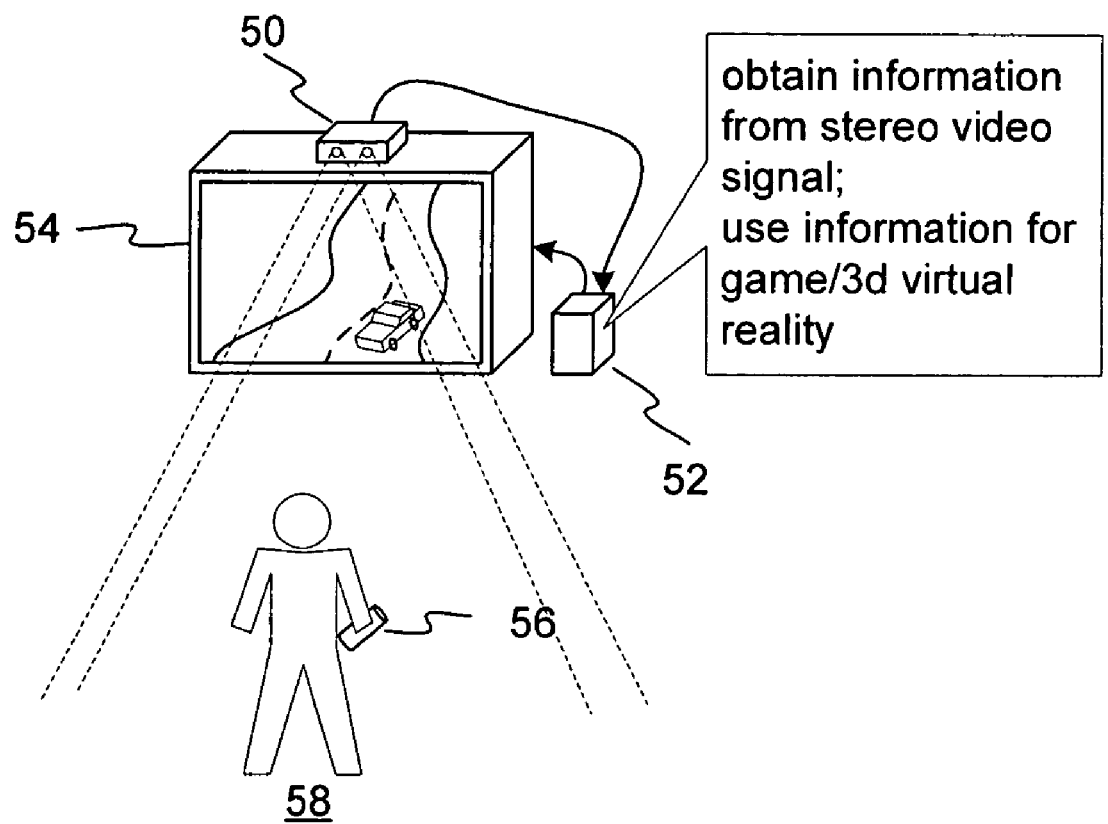
FIG. 1 shows a stereo camera connected to a game console.

FIG. 1 shows a stereo camera 50 connected to a game console 52. The game console 52 is connected to a display 54. The stereo camera 50 captures video of a real object 56 and a real person 58 holding the object 56. The captured stereo video includes any arbitrary background of the captured scene, for example, scenery, walls, distant objects such as furniture, etc. In a preferred embodiment, the stereo camera 50 is placed atop the television or display 54. In the arrangement shown in FIG. 1, the stereo camera 50 provides a stereo video signal of the captured video to the game console 52, which the game console 52 processes to generate, for example, control information for controlling a game, graphics information to supplement the graphics of the game or 3d virtual reality, 3d information about objects in the scene, etc. For example, as discussed later with reference to FIGS. 7-10, actions and appearances of the person 58 and/or object 56 can be translated into actions and/or appearances in a 3d virtual reality rendered by the game console 52.

Figure 2:
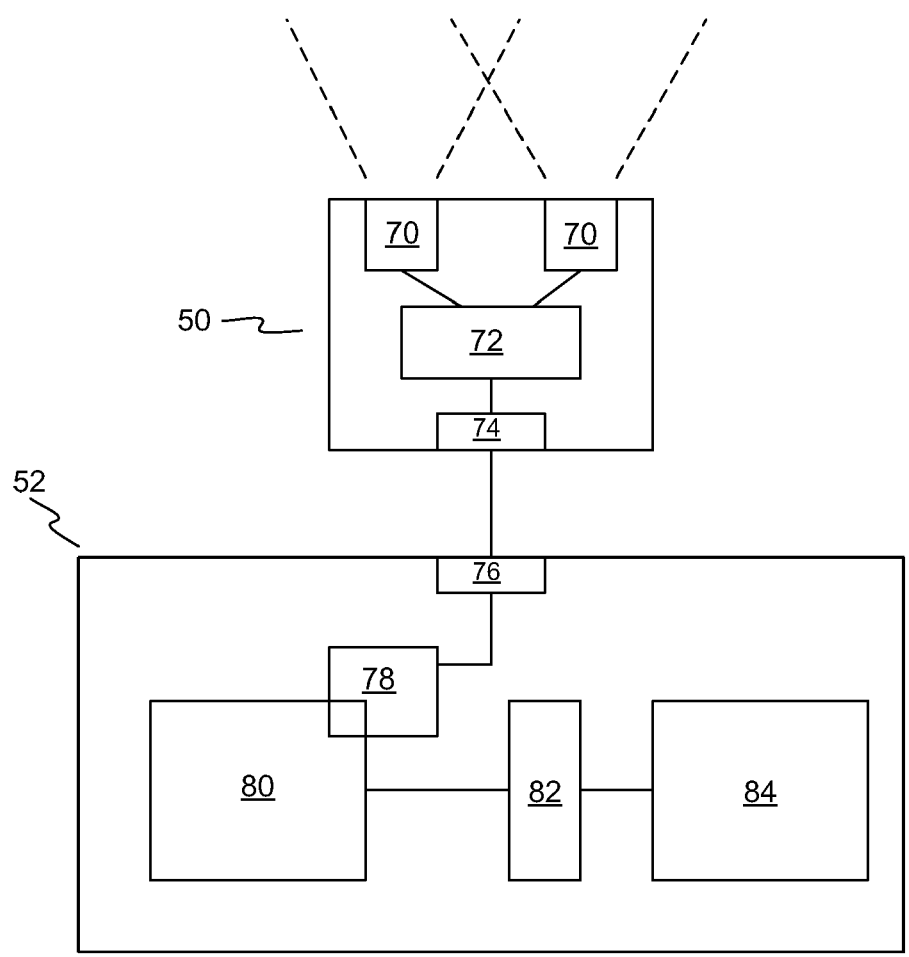
FIG. 2 shows a high level system diagram of a game console configured to operate in conjunction with a stereo camera.

FIG. 2 shows a high level system diagram of a game console 52 configured to operate in conjunction with a stereo camera 50. In a preferred embodiment, the stereo camera 50 has at least two image capture devices 70, such as a pair of CCDs. Low level capture and processing circuitry 72 captures raw image data from the image capture devices 70. The circuitry 72 may perform some basic image processing functions on the raw image data, for example synchronization, frame rate adjustment, resizing, color balancing, contrast adjustment, and so on. The circuitry 72 outputs a stream of stereo video, and the stereo camera's communication interface 74 passes the stereo video data to the computer or game console 52. The communication interface 74 can communicate with the game console 52 using any form of physical communication, such as radio, electrical, or optical signals. In a preferred embodiment the communication interface 74 is a Universal Serial Bus (USB) interface.

The game console 52 receives the stereo video signal via an interface 76. In a preferred embodiment, the stereo video signal is then processed by a special device driver 78. The device driver 78 performs image processing on the stereo video signal to obtain information about the scene captured by the stereo video signal. Details of the special device driver 78 are discussed later. The device driver 78 is managed by an operating system 80 (which may be embedded in the game console 52), and the device driver 78 is invoked and used by an application program or game 82.

The game 82 may use a 3d game engine 84. In a typical configuration, different games may share a common game engine 84. A game program typically includes the content (models, animations, sounds, textures or texture-generating procedures, and physics) and code that makes the game work, such as artificial intelligence, game and control logic, etc. Game engine 84 can be thought of as the software that is not specific to any particular game. A game engine typically performs functions such as rendering, storing models and scenes, lighting, shading, managing network connections, detecting collisions, and more. The game engine 84 generates frames for display.

The functionality of the device driver 78 may be accessed using a special application programming interface (API), with functions for performing high-level operations such as: return a list of objects separated from the background; return the 3d position or orientation of a particular separated object; return the identity of a particular separated object, perhaps among a supplied list of candidates; return the 3d geometry of a particular foreground/background separated object (e.g. depths of pixels that correspond to the object); return an image of a select object, the image having the background effectively removed; and others. Although a device driver is a convenient type of component for encapsulating stereo processing functionality, a device driver is not required. Stereo processing can also be included as part of the operating system 80, or as part of the game or application 82, or even as a special hardware component of the game console 52. The game 82 obtains the high-level image processing output of the device driver 78 and uses it to help determine the behavior and/or appearance of the game.

In a preferred embodiment, the stereo camera 50 is preferably an integrated device where the image capture devices 70 share common circuitry and housing. Shared processing circuitry 72 allows stereo video frames from the capture devices 70 to be easily paired and synchronized, and the shared housing gives a fixed geometric relation between the image capture devices 70, which reduces the computational complexity needed to analyze the stereo video signal. Nonetheless, a pair of independent cameras can also be used, each outputting a video signal and possibly with a connection to game console 52. In this case, some form of calibration and synchronization will usually be needed.

Figure 3:
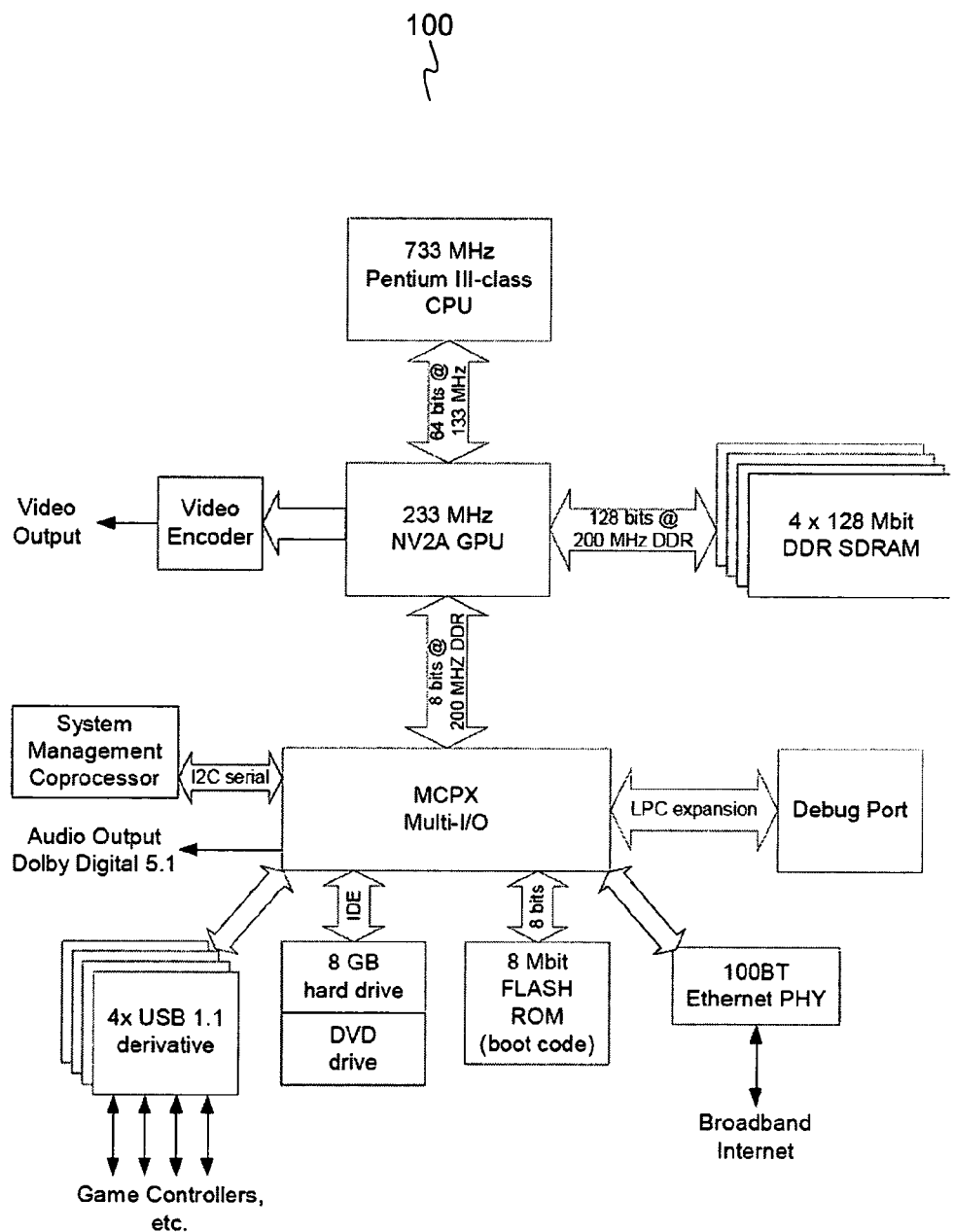
FIG. 3 shows an example of a game console.
Figure 4:
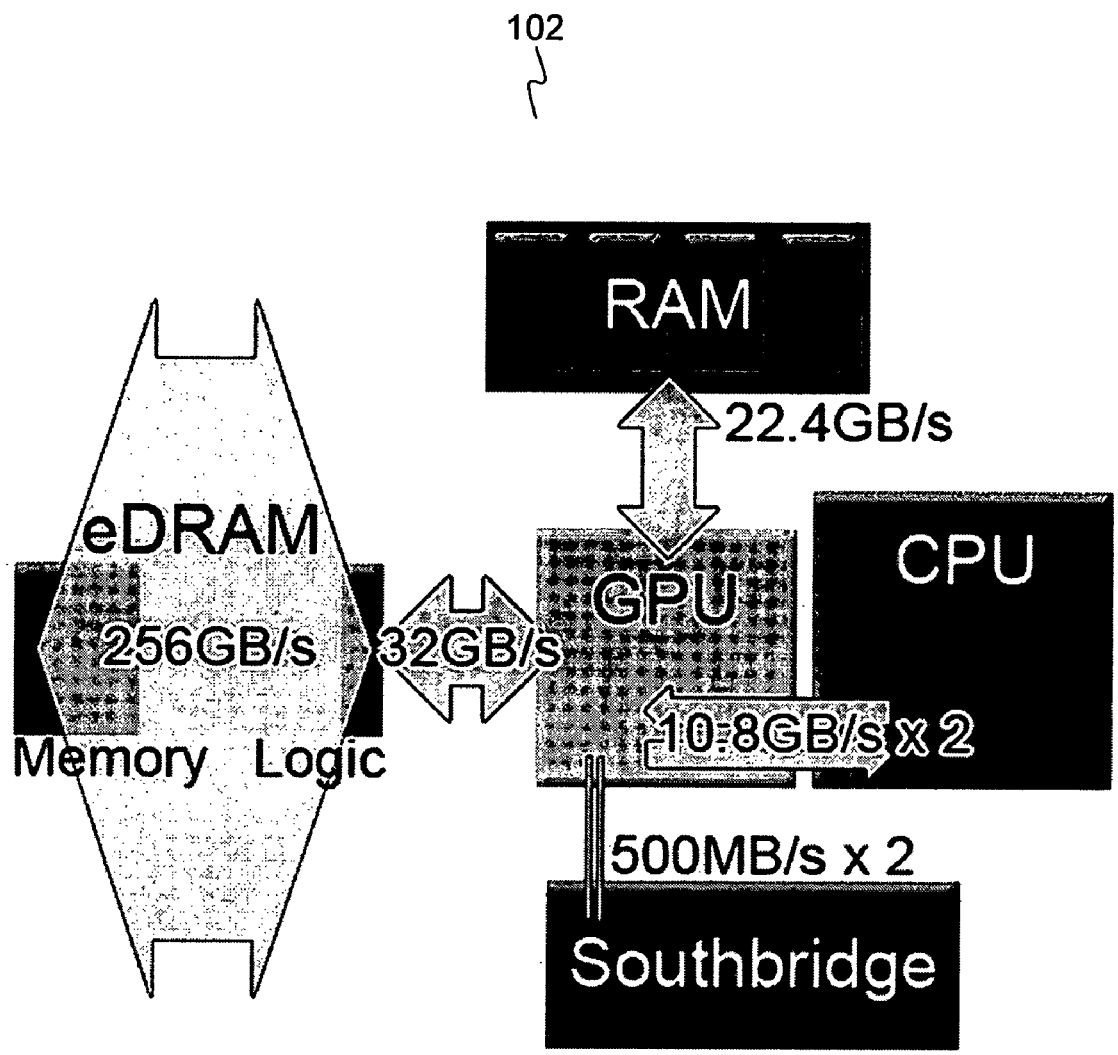
FIG. 4 shows another example game console.

FIG. 3 shows an example of a game console 52. The individual components of example game console 100 are labeled and self-explanatory. FIG. 4 shows another example game console 102. Another example of a game console may be found in U.S. Patent Publication number 20020138637. As can be seen from these examples, a typical game console 52 has high end components such as one or more CPUs, a GPU, memory, and high speed communication between the components.

Figure 5:
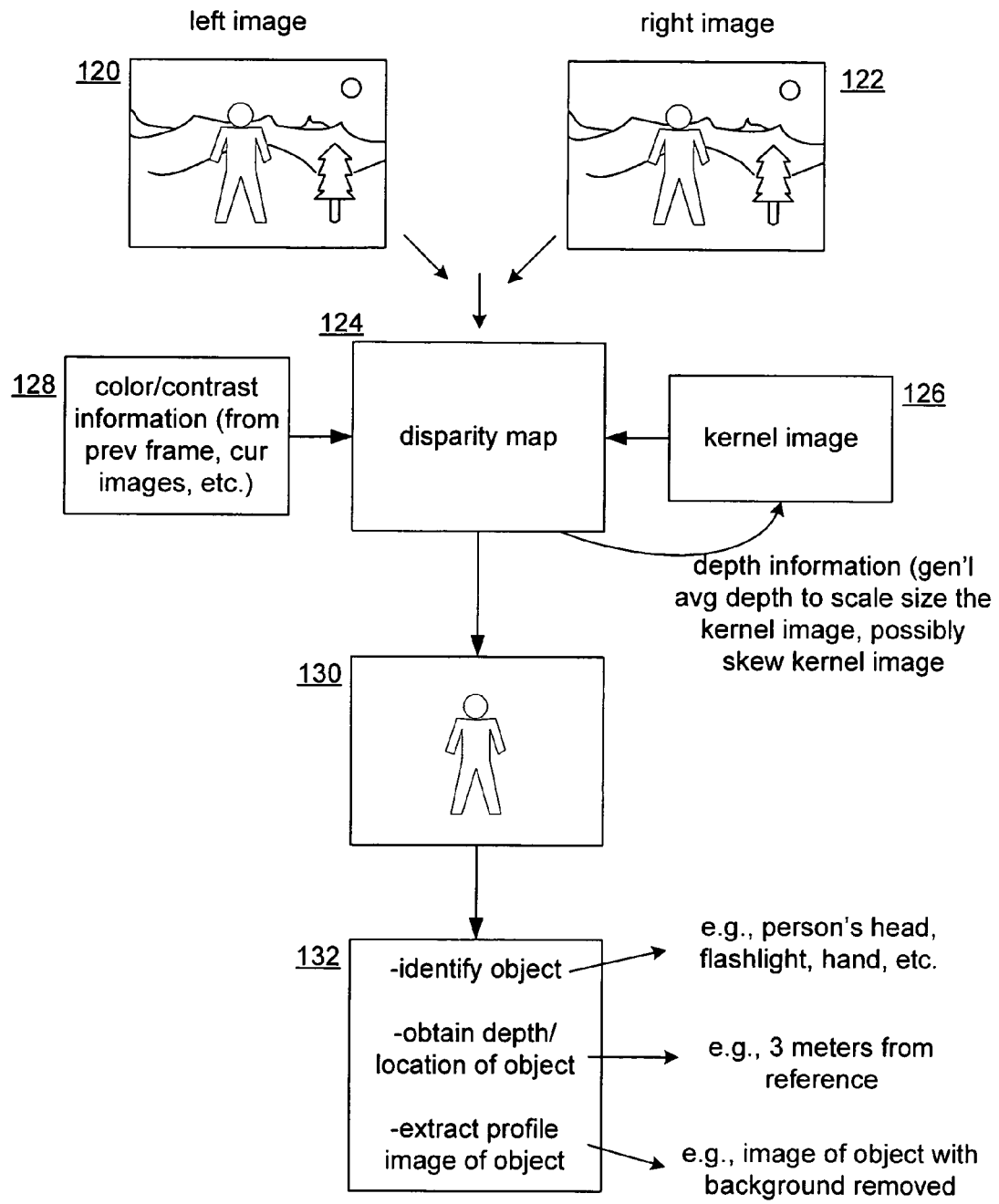
FIG. 5 shows how information about a scene can be extracted from a stereo video signal by device driver.

FIG. 5 shows how information about a scene can be extracted from a stereo video signal by device driver 78. The device driver 78 receives a stream of stereo video, which is a stream of paired images, each from a respective image capture device 70. The images are sometimes referred to as left and right images. FIG. 5 shows a left image 120 and a right image 122. Although images 120, 122 appear identical in FIG. 5, paired stereo images actually differ slightly due to the different position and direction of their respective image capture devices. The difference or disparity between two stereo images is computed and stored as a disparity map 124. The disparity map 124 is an array of pixel values which represent the stereo disparity between the left and right images 120, 122 at matching pixels. To generate the disparity values of the disparity map 124, any suitable dense stereo algorithm may be used. For example, a four-plane model for dynamic programming may be used, although other graphs may be employed, such as a three-plane model, a single plane model, and the like.

The disparity map 124 is compared to at least a portion of the kernel image 126 to determine matching disparity values. A disparity-based kernel image is a model or template disparity map that is compared against the disparity map 124. The use of a kernel image is optional. A kernel image can be used to rapidly recover the approximate silhouette of an object. A more precise but costly alternative, discussed in the next paragraph, is to use optimization methods to define a binary mask of foreground vs. background points. The kernel image 126 can be an array of pixel values which represent the stereo disparity of an object to be located or searched for. More particularly, the kernel image 126 is an encoding of the silhouette of the object to be located as well as surface shape of the object to be located, e.g., the 'bumpiness' or depth of the object. In this manner, the kernel image 126 indicates the 3d surface shape of the object to be located from a point of view. The kernel image 126 can be, for example, a predetermined disparity map of a generic torso shape or any other shape or object. The kernel image 126 can be calculated in advance, or derived from a previous disparity map, or otherwise obtained. The kernel image 126 can be an approximation of the object that it represents, in other words, a rough model of the object. The disparity map 124 can also be used to determine the depth or distance of pixels relative to the stereo camera 50. An average of these distances (a distance to the object) can be used to scale the kernel image 126 before disparity map 124 is searched against the kernel image 126. As discussed below, color/contrast information 128, possibly from a preceding disparity map or previous stereo video frames, can be used in separating the background.

In general, it should be noted that disparity alone can be a basis for foreground/background separation, based on the assumption that points on a foreground object are more likely to have high disparity. Pixels of a foreground object can be separated based on their degree of disparity.

Foreground/background separation can be performed by fusing a stereo-based segmentation algorithm with a color/contrast based segmentation algorithm. Algorithms for automatically separating layers using color/contrast or stereo alone are often prone to errors. By fusing color/contrast analysis with stereo matching information, layers can be inferred accurately and efficiently. A Layered Dynamic Programming (LDP) algorithm can be used to solve stereo in an extended 6-state space that represents both foreground/background layers and occluded regions. The resulting stereo-match likelihood is then fused with a contrast-sensitive color model that is learned on the fly, and stereo disparities are obtained by dynamic programming. A second algorithm, Layered Graph Cut (LGC), can be used to marginalize the stereo match likelihood over foreground and background hypotheses for fusion with a contrast-sensitive color model like the one used in LDP. Segmentation is then solved efficiently by a ternary graph cut. In sum, the device driver 78 uses one or more algorithms for fast and reliable foreground/background segregation using stereo and/or color/contrast information, which produces a separated foreground object 130. For additional details, see "Bi-layer segmentation of binocular stereo video", by Vladimir Kolmogorov, Antonio Criminisi, Andrew Blake, Geoffrey Cross, Carsten Rother (US Proc. IEEE Computer Vision and Pattern Recognition, 2005).

The separation techniques discussed above have certain properties. They are robust and fast enough for real time use. They generally do not generate artifacts, even when the color of an object at its edge is the same as part of the adjoining background. The techniques are able to extract a synthesized image of an object that is mostly free of artifacts; the background is cleanly removed. A silhouette can be recovered to pixel (or even subpixel) precision, so that when the recovered foreground is superimposed on a new background, color from the old background does not leak in.

Having separated stereo images of one or more objects in a scene, different types of information about objects in a scene can then be determined 132. For example, different types of objects can be identified by using different kernel images 126. If an object has been separated from the background, that object can be identified by comparing it to different kernel images. Stereo-based depth information can also be obtained. A virtual or cyclopean image of the object can be computed from the left and right image using ordinary geometry-based techniques. The location of the separated object in the stereo-based image and/or an input image may be indicated in any suitable manner. For example, the disparity data, pixel locations, or any other suitable indicator of the located object may be associated with the image as meta-data. The image with the located object may be used by the display manipulator module to perform some action or it may be sent to another application. Artifacts in the generated image can be corrected using a split-patch search algorithm, which may involve: restricting candidate patches to those lying on corresponding (left or right) epipolar lines; constraining a search region using tight, geometric depth bounds; and applying exemplar-based synthesis sparsely, where flagged by an inconsistency test. For further details, see "The SPS Algorithm: Patching Figural Continuity and Transparency by Split-Patch Search", by Antonio Criminisi, Andrew Blake, (US Proc. IEEE Computer Vision and Pattern Recognition, 2004). Border matting is an alternative method for correcting artifacts and obtaining pixel or subpixel precision. For details, see V. Kolmogorov, A. Criminisi, A. Blake, G. Cross, C. Rother, Probabilistic fusion of stereo with color and contrast for bi-layer segmentation, June 2005, MSR-TR-2005-35.

It should be appreciated that stereo image analysis as discussed above can be repeatedly performed in real time on paired frames of the stereo video signal. This allows real time operations such as tracking the changing position of an object, providing accurate real time "cut out" video of an object as it moves and changes (i.e., video of an object with the background cleanly removed regardless of the nature of the background), and providing a dynamic depth map of an object as it moves or changes in real time.

Figure 6:
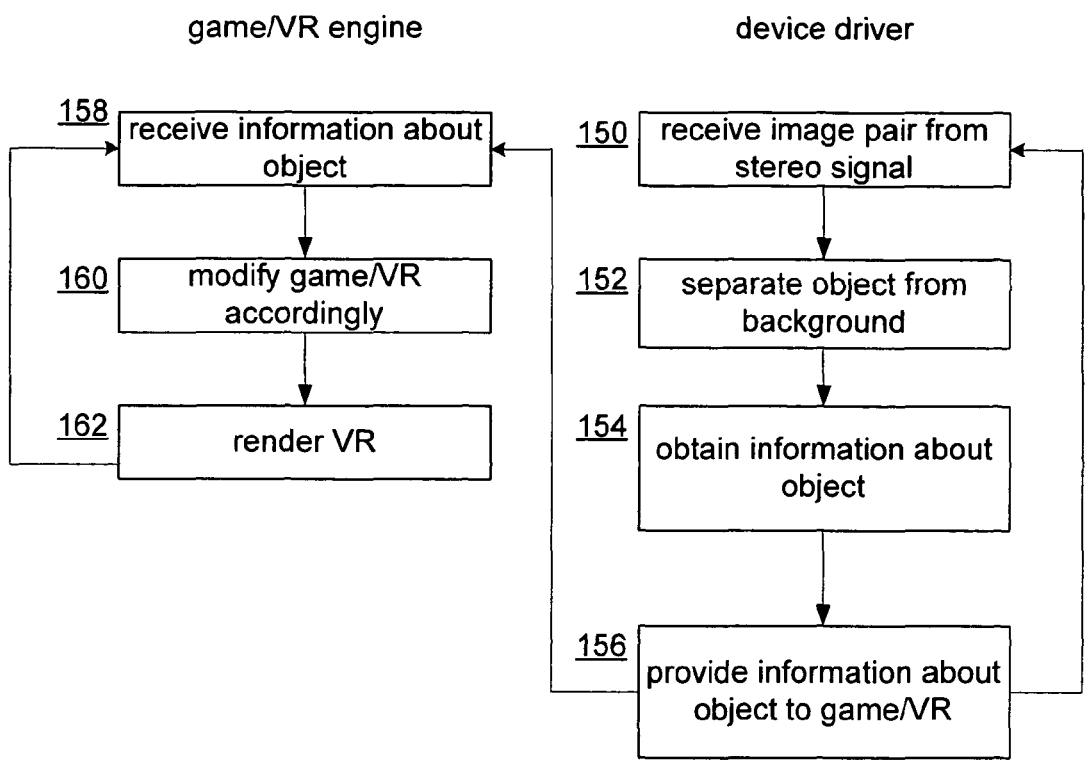
FIG. 6 shows how stereo-derived object information can be used in conjunction with a game and VR engine.

FIG. 6 shows how stereo-derived object information can be used in conjunction with a game and VR engine. A stereo image pair is received 150 from a stereo video signal. Using one or more techniques discussed above, for example stereo matching segmentation fused with color/contrast segmentation, foreground/background separation is performed to separate 152 one or more objects from the background. Information about the one or more objects is obtained 154, for example, depth information, a well-defined image of the object, the identity of the one or more objects, etc. This information is provided 156 to the game program. The game program receives 158 the object information and uses it (some examples follow, see FIGS. 7-10) to affect or modify 160 the behavior or "play" of the game, and/or the appearance of the game, or other aspects of the game. As instructed by the game program, the render engine renders 162 the game as modified 160 in accordance with the stereo-derived object information.

Figure 7:
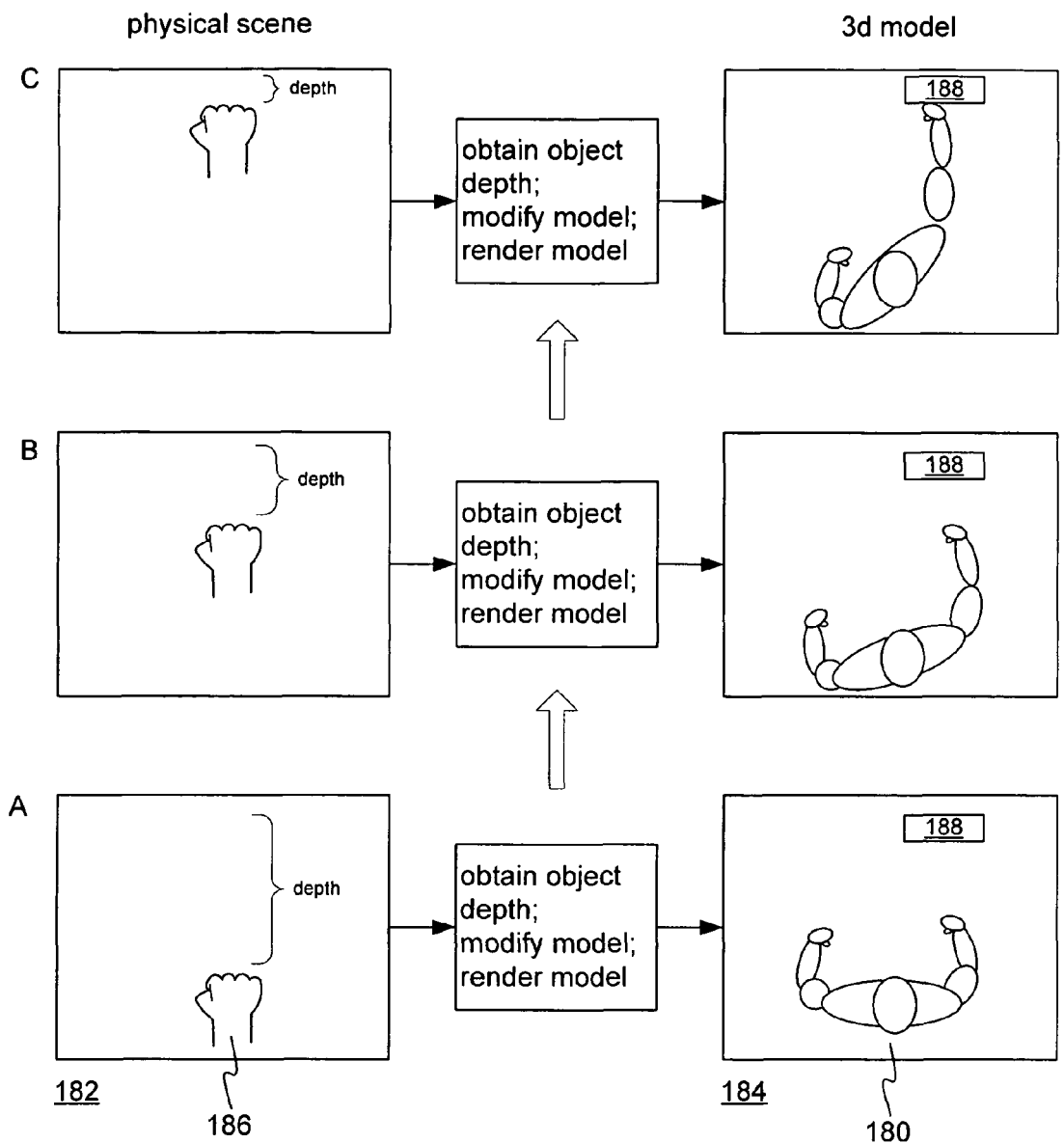
FIG. 7 shows an example of how stereo-based foreground/background separation can be used to control a model or avatar in a 3d game.

FIG. 7 shows an example of how stereo-based foreground/background separation can be used to control a model or avatar 180 in a 3d game. The boxes on the left side of FIG. 7 represent real scenes 182 captured by a stereo camera. Although for discussion the real scenes 182 are shown overhead, the real scenes 182 in practice would be captured from a stereo camera with a somewhat horizontal line of sight (e.g., on top of a television). The boxes on the right side of FIG. 7 show overhead views 184 of a 3d virtual scene with a foreground model or avatar 180. Starting chronologically at the bottom of FIG. 7, at stage A, a hand 186 is captured in stereo and separated from its background as discussed above. The depth of the object, in this case the hand, is obtained. For example, at stage A the hand's depth may be 3 meters from the stereo camera, or, the hand's 186 depth may be measured relative to some other reference point or stereo-recognized object such as the body, head, torso, etc. of the person whose hand 186 is being captured. The depth is used to modify the avatar model 180 by transforming the model 180 to place the right hand and arm of the model in accordance with the detected depth of the hand 186. Through subsequent stages B and C, as the real hand 186 is detected to change in depth (approach the stereo camera, move away from the real body to which it is attached, etc.), the avatar model 180 is modified accordingly, thus modeling the motion of the hand 186. In effect, stereo-based foreground/background separation is used to control the avatar model 180. Furthermore, the avatar model can be checked for collision detection, for example with model 188.

It should be noted that boundary recovery to pixel precision (or better) can have allow not just determining the location of an object (e.g., "a limb") but its precise outline, shape, and interior texture. Thus the entire shape and texture of the object can be reproduced elsewhere, and can be subjected to transformations of color or shape or texture along the way.

It should be appreciated that the example of FIG. 7 involves more than just the use of stereo-derived depth information to control an avatar. Stereo cameras are generally useful for obtaining raw depth or distance information about pixels. However, accurately identifying an object in association with its depth is a more complex and useful procedure. In other words, ordinary stereo analysis may provide depth of pixels, however, mere depth information may not accurately indicate which of those pixels correspond to particular objects. By using a kernel image, color/contrast information, or other techniques for foreground/background separation, depth information can be provided for particular objects, which can allow objects to be individually mapped to depth-sensitive actions or objects in a game or 3d virtual reality.

Although it is possible to continuously change a model to correspond to the continuously changing depth of a physical object, for performance reasons, some games have only a limited or predefined set of motions or animations for a model, whether the model is a model of a human figure, an automobile, a robot, an animal, etc. In other words, a model may have a set of predefined animations such as jumping, switching items, crouching, turning left, turning right, etc. In this case, gesture recognition may be used rather than a direct mapping between the shape or position of a model and the detected depth or position of an object.

Figure 8:
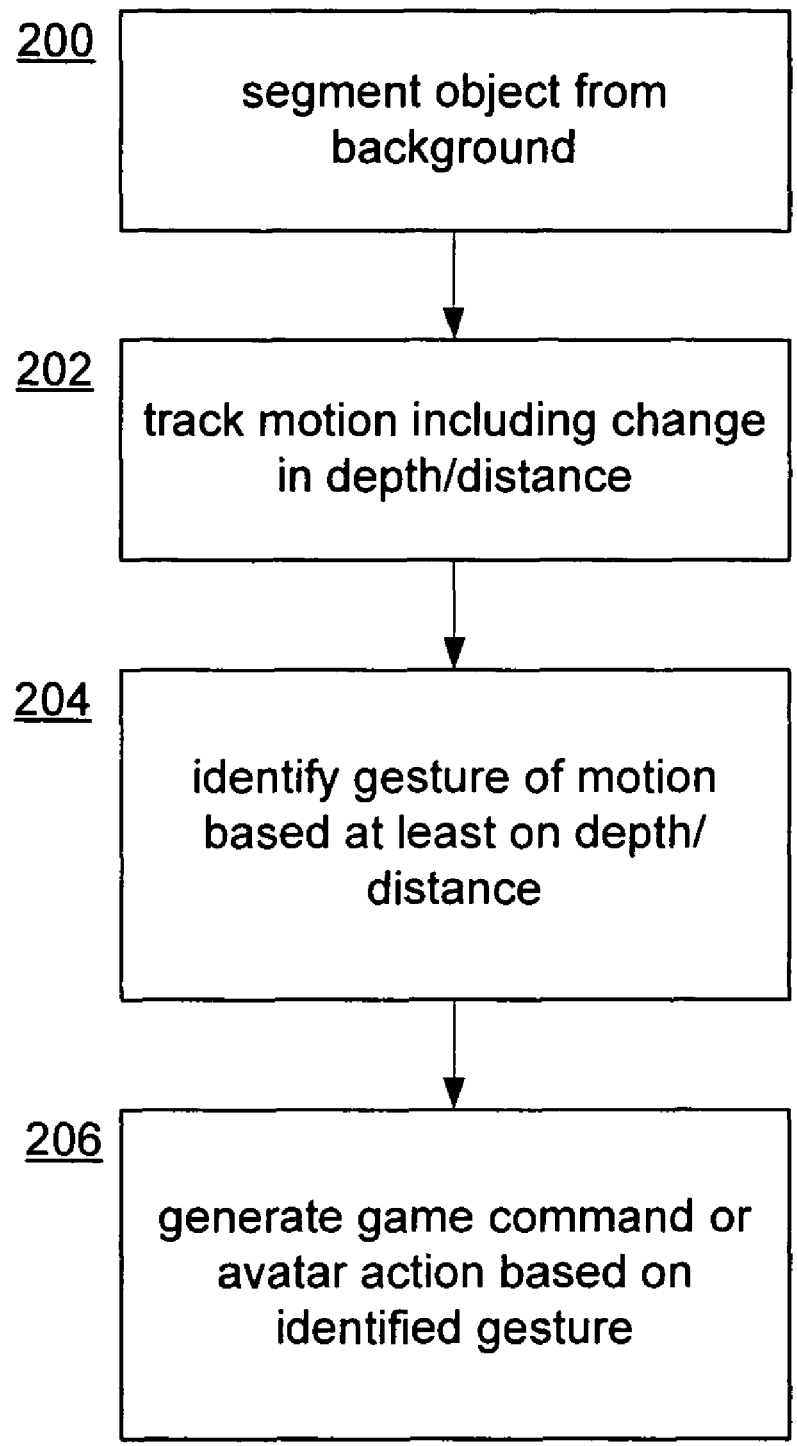
FIG. 8 shows a process for using stereo foreground/background separation to recognize gestures for controlling a game.

FIG. 8 shows a process for using stereo foreground/background separation to recognize gestures for controlling a game. Paired stereo images are processed to segment 200 an object therein from its background. Again, kernel disparity maps, depth information, and color/contrast information can be used to accurately segment 200 the object from its background. The position of the segmented 200 object is determined, and, using a previous location of the object, the object's motion is tracked 202. For example, the 3d path of a hand, an object in a hand, or a head, or a body, or any other real object can be tracked 202. The tracked motion of the object, which includes at least depth information, is identified 204 as a particular 3d gesture. The identified 204 3d gesture then acts as a trigger to generate 206 a corresponding model motion or action, which might correspond to an action command in the game, for example.

Gestures can be recognized in a number of ways. For example, an object's tracked path or motion can be compared against a set of predefined motion templates. A predefined motion template can include information, for example, such as a 3d volume (for the motion path) divided into ordered sub-volumes, each of which must be occupied by the object, in order, over a given range of time. If the tracked object is a handheld cylindrical object, the path of the cylindrical object could be compared to various specific motion templates, such as a side-to-side sweep motion template, an overhead downstroke motion template, a poke motion, etc. Whenever the continually updating recent motion path of the axe matches one of its motion templates, the template's gesture is identified 204 as having occurred, and a corresponding command is issued. Simpler gesture recognition techniques can be used. For example, movements can be mapped to basic directions and in turn corresponding direction commands in a game. For 3d navigation, a real object can be detected to move up, down, left, right, forward, or backward, or combinations thereof (e.g., forward, up, and to the left), and a corresponding movement command may be issued in the game. In other words, stereo-based foreground/background separation can be combined with depth information to generate three-dimensional direction commands.

Figure 9:
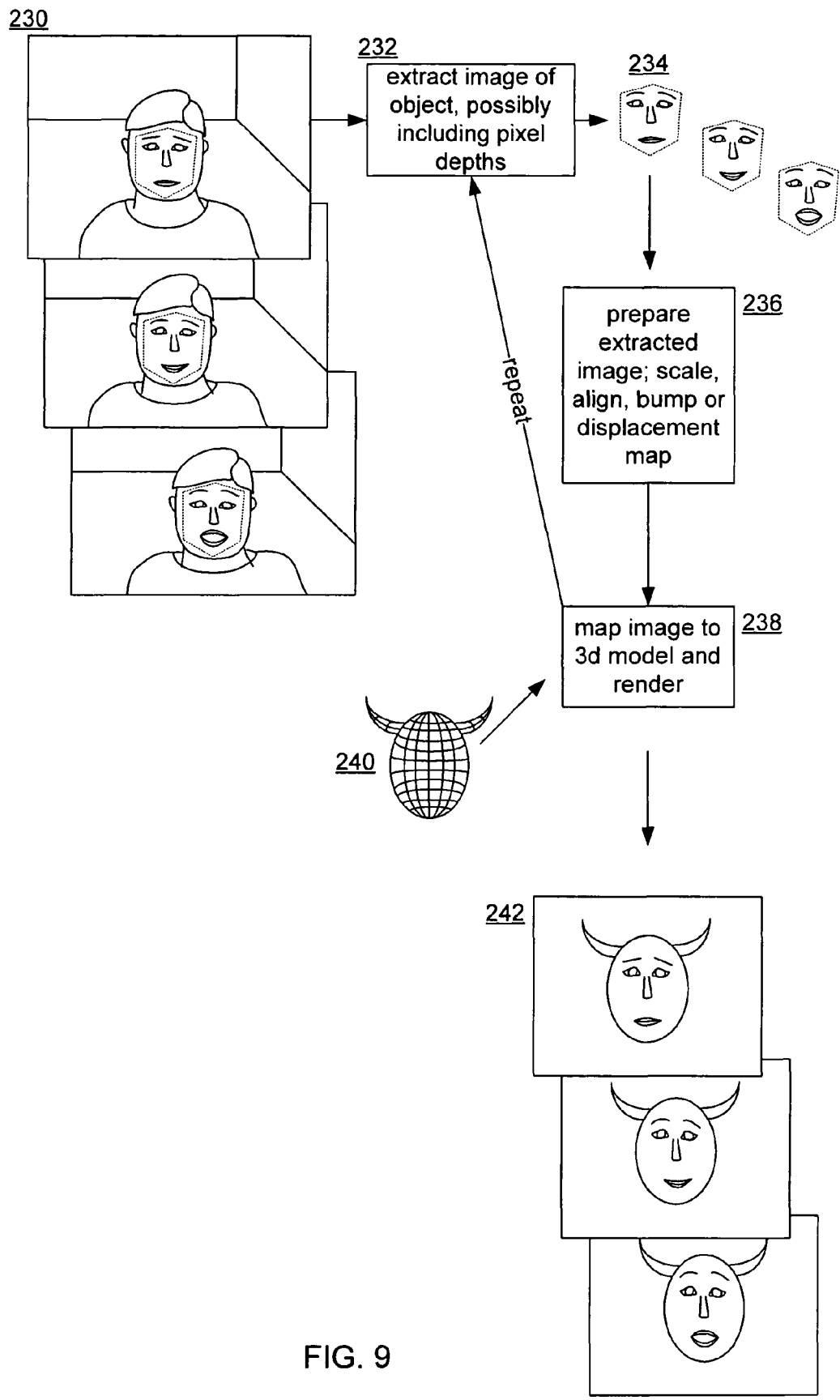
FIG. 9 shows an example of mapping a separated image of a foreground object to a model that is then rendered and displayed.

FIG. 9 shows an example of mapping a separated image of a foreground physical object to a model that is then rendered and displayed. The boxes 230 in FIG. 9 represent a real world scene as seen by a stereo camera, in this case, a person's torso in a room. An image of an object is extracted 232 from stereo images of a scene using techniques discussed above. For example, a kernel disparity image of the rough form of a human torso can be used for foreground/background separation, possibly in conjunction with other techniques. In one embodiment, the extracted image can include depth values of the pixels of the image. In other words, a 3d image of the detected object. In the example of FIG. 9, by keying on facial features, the extracted image is processed further to obtain a particular portion of the object—the face. The original or the refined images 234 can be normalized so that the edge pixels have a depth of zero. In the example, an image of the face could also be obtained from a suitable face-like kernel image.

Because an image of the extracted object is going to be used in a 3d game or virtual reality, the extracted image 234 may be further prepared 236 for 3d rendering. For example, the image 234 may be rescaled or re-dimensioned. The image 234 may be converted into a bump map or a displacement map. Other operations can be used. For example, the color of the image may be adjusted to match the 3d scene that it will appear in. Finally, in one embodiment, the image is mapped 238 to a 3d model 240. This can involve texture mapping the color values of the pixels, or using the depths of the pixels to displace vertices of the model 240 (i.e., displacement mapping), or mapping a bump map of the image to the model 240. In one embodiment, the image's 3d depth values are not used and the color values of the pixels are mapped to the surface of the model 240. In another embodiment, only the depth values are mapped to the model 240. Furthermore, if a displacement or bump map is used, processing time may be too high for updating the model 240 in real time to match changes in the scene, and the mapping 238 may occur only once during an initialization stage. However, in a preferred embodiment the entire process is repeated in real time so that frames of the 3d game are rendered to match changes in the scene in real time as captured by the stereo camera. In either case, renderings 242 are based on images of an object obtained using stereo-based foreground/background separation.

In another embodiment, the extracted image of the object is not mapped 238 to a model. Techniques for stereo-based foreground/background separation have advanced to the point where foreground images can be separated cleanly and efficiently, even if the background has a same color as the object in the foreground. Furthermore, the images can be separated and synthesized in such a manner that the images are significantly free of artifacts. In other words, an accurate profile of the object can be obtained; the background is accurately removed independent of the nature of the background. Extracted images usually have a quality comparable to images obtained using blue or green screen separation; the images are sharp and accurate representations of the object. Therefore, an image of an object can be displayed directly in a game or 3d virtual reality, either as a planar surface, or as a 3d surface, possibly with some modeled "backing" to allow 3d non-frontal viewing.

In another embodiment, the extracted image is co-displayed with the 3d virtual reality, but is not incorporated into the 3d virtual reality. For example, if a number of players are participating in a same 3d virtual reality (each with a stereo camera), each player's "heads up display" (user interface) may include images or real time video of the head/torso of each participant. The general idea of using stereo techniques to extract foreground images cleanly separated from the background and immersing the images in a game can take other forms. For example, extracted images or video can be displayed as two-dimensional images, whether in a two-dimensional game or a three-dimensional game. As another example, extracted images could be displayed in a virtual monitor (within the game) or an instant-messenger type of application (within the game or as part of the game interface). A remote partner or combatant can be seen, in some form, within scenes in a game.

In another embodiment, a game is provided with artificial intelligence for recognizing facial gestures of stereo-extracted face images. This information can be incorporated into a game in any number of ways. Artificial-intelligence game characters can be programmed to respond according to a player's facial gesture, for example, responding positively to a smiling face, or responding negatively to a frowning or angry face.

Figure 10:
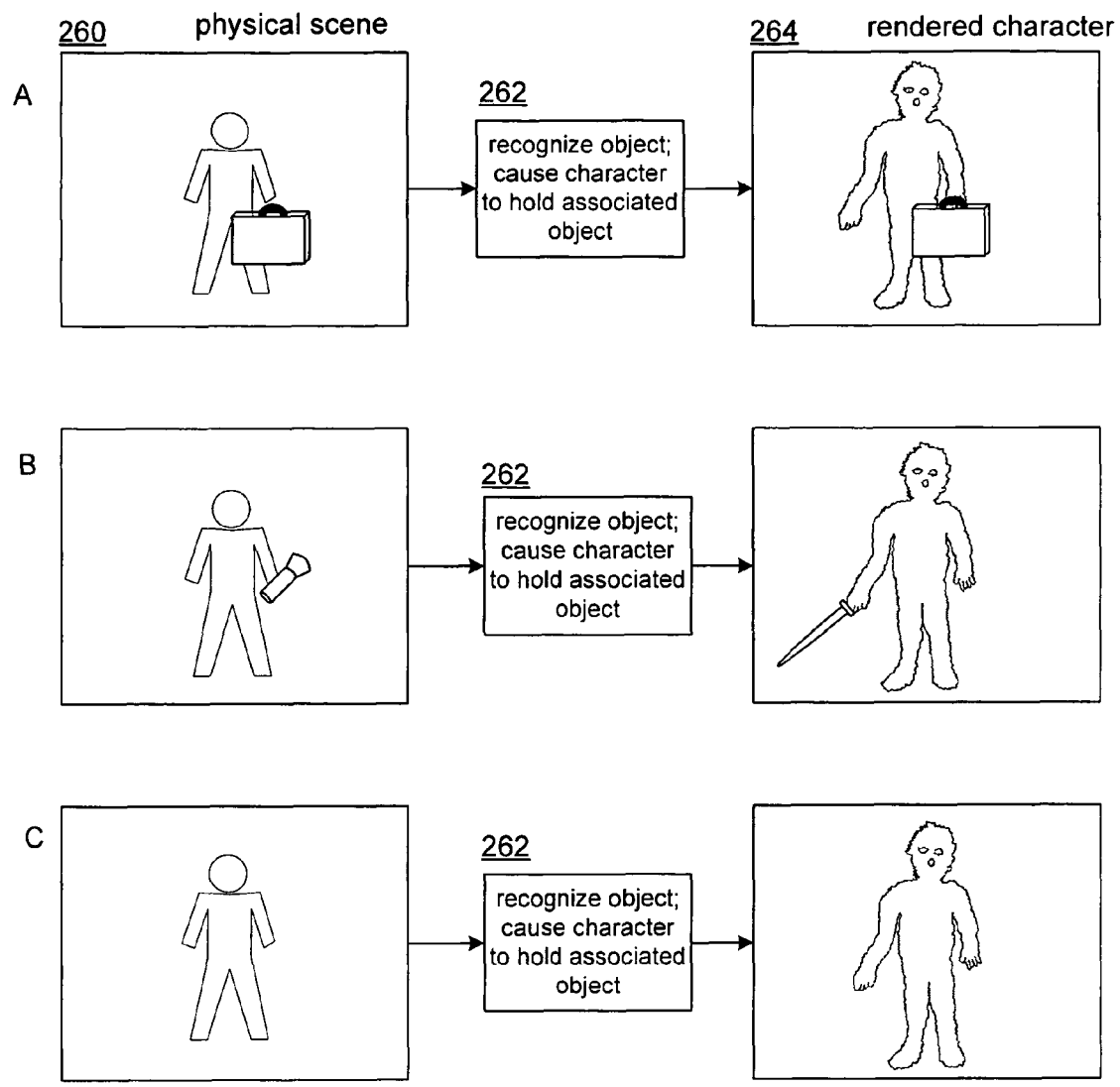
FIG. 10 shows how stereo-based object recognition can be used for 3d gaming.

Stereo-based foreground/background separation is also useful for object recognition. FIG. 10 shows how stereo-based object recognition can be used for 3d gaming. As discussed above, the stereo video signal can be searched for kernel images of different types of objects, thus performing a form of object detection or recognition; if a kernel image is matched to a portion of a captured scene, the object associated with that kernel image is deemed to be present in the scene. Consider an example where there are three kernel images (not shown) to be searched for: a kernel image of a briefcase; a kernel image of a flashlight or cylindrical object; and a kernel image of an arm/hand holding nothing. In this example, the game is a type where the player controls a 3d avatar, character, vehicle, etc. that is rendered and displayed. In a first physical scene 260 A, a real person is holding a briefcase. One or more pairs of stereo frames are processed to recognize 262 the object (e.g., "a briefcase").

In response to the recognition 262, the game causes the 3d character to "hold" a corresponding virtual object such as a virtual briefcase. The holding of the object can simply be implemented as a change to the state of the character (e.g., a flag is set indicating that the virtual object is currently being held) without any corresponding change in what is displayed or rendered. Additionally or alternatively, the virtual holding can be implemented by causing the 3d character to be rendered to appear to hold a virtual object associated with the matched kernel image, as seen in rendered characters 264. Similarly, in scene 260 B, a flashlight is recognized 262 and the game character is modified and/or rendered accordingly. If the recognizing 262 is handedness sensitive, then if the flashlight is in the same hand as the briefcase was, the character is made to stop holding the virtual briefcase, or if the flashlight is in the real person's other hand, then the character might be made to virtually hold both virtual objects. In scene 260 C, an empty arm/hand is recognized and the game character is rendered accordingly. In this manner, a person with a set of real objects can control the objects virtually held by a game character by picking up any of the corresponding real objects. Real objects held in a hand can be recognized by using both the kernel image of the arm/hand and the kernel images of the other objects to detect which object is currently in a hand of the person. As mentioned earlier, kernel disparity images can be obtained in advance (e.g., part of the content embedded in a particular game), or during a training process where an object is held in front of the stereo camera, or from disparity maps extracted from earlier processed scenes.

Other objects can be recognized. For example, clothes, hats, etc. worn by a real person can be recognized and similarly translated into the 3d virtual reality. Even large articles or props such as bicycles, furniture, etc. can be recognized with similar effect.

In general, it has been shown how game consoles and 3d virtual reality systems can benefit from a richer set of visual control information and the addition of real-time information, including video, of objects. Stereo video processing can be used to improve a game system, for example by providing more natural control, providing real-time images for importation or translation into a 3d virtual reality, and so on. Embodiments relating to immersing or displaying stereo-extracted images of foreground objects into 3d games or virtual realities can also be applied in 2d games, the broader idea being immersion into computer generated graphical environments.

In conclusion, those skilled in the art will realize that storage devices used to store program instructions can be distributed across a network. For example a remote computer may store an example of a process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable or configure computing devices to perform the various embodiments discussed above. This is also deemed to include at least volatile memory such as RAM storing information such as CPU instructions during execution of a program carrying out an embodiment, as well as non-volatile media storing information that allows a program or executable to be loaded and executed.

The invention claimed is:

1. A method for producing a video sequence comprising:
   receiving stereo images of a captured scene with a physical foreground object and a physical background;
   using a first disparity map to generate a kernel image, the kernel image comprising an array of pixel values representing a stereo disparity of an object to be located;
   scaling the kernel image using a second disparity map, the scaling based on at least a distance of a corresponding portion of the object relative to a stereo camera that provided the stereo images;
   performing, in real-time, a foreground/background separation algorithm on the stereo images, the separation algorithm configured compute differences between the received stereo images and stores the differences as a third disparity map;
   comparing the third disparity map to at least a portion of the scaled kernel image to identify pixels of the stereo images that represent the physical foreground object; and
   providing the identified pixels that represent the physical foreground object to at least one of a two dimensional and a three dimensional game.

2. The method of claim 1, the pixels forming borders that substantially correspond to respective physical profiles of the physical foreground object.

3. The method of claim 2, the comparison of the third disparity map to at least a portion of the scaled kernel image configured to identify the pixels for any physical background comprising arbitrary and substantially non-uniform colors.

4. The method of claim 2, one or more borders having a portion corresponding to a portion of the physical foreground object that partially obscures a portion of the physical background that has a same color as the obscuring portion of the physical foreground object.

5. The method of claim 2, the foreground/background separation algorithm configured to use at least one of stereo disparity, stereo matching, and a color of pixels from frames of a stereo video signal.

6. The method of claim 1, the foreground/background separation algorithm comprising obtaining a stereo-match likelihood and fusing it with a contrast-sensitive color model.

7. The method of claim 1, a model in a 3d virtual reality is at least one of moved and reoriented in accordance with changes in at least one of location and orientation of the physical foreground object as determined based on the identified pixels.

8. The method of claim 1, the method comprising using the identified pixels to determine at least one of a 3d location and an orientation of the physical foreground object relative to the stereo camera and at least one of locating and orienting a 3d model in accordance with at least one of the 3d location and the orientation of the physical foreground object.

9. The method of claim 1, depth values of the pixels are determined based upon the comparison and are used for controlling a 3d virtual reality in the game.

10. The method of claim 9, the depth values are used to control at least one of movement and orientation of at least one of a model and viewpoint in the 3d virtual reality.

11. The method of claim 1, comprising, based upon the identified pixels, mapping motions of the physical foreground object to predefined commands used to control a 3d virtual reality in the game.

12. The method of claim 1, pixels captured from a real-time stereo video signal that represent the physical foreground object are identified in the absence of color and stereo-matching information.

13. The method of claim 1, comprising correcting for at least one artifact in at least one identified pixel of the physical foreground object.

14. The method of claim 13, correcting for the at least one artifact in the at least one identified pixel of the physical foreground object comprising using a split-patch search algorithm.

15. The method of claim 1, the foreground/background separation algorithm is configured to:
obtain a stereo-match likelihood using a layered dynamic programming algorithm configured to solve stereo in an extended 6-state space representing at least one foreground-background layer and one occluded region;
use a layered graph cut algorithm to marginalize the obtained stereo-match likelihood over foreground and background hypotheses; and
fuse the obtained stereo-match likelihood with a contrast-sensitive color model.

16. A computer readable storage device configured to store computer executable instructions for enabling an apparatus to perform a method, the method comprising:
receiving stereo images of a captured scene with a physical foreground object and a physical background;
using a first disparity map to generate a kernel image, the kernel image comprising an array of pixel values representing a stereo disparity of an object to be located;
scaling the kernel image using a second disparity map, the scaling based on at least a distance of a corresponding portion of the object relative to a stereo camera that provided the stereo images;
performing, in real-time, a foreground/background separation algorithm on the stereo images, the separation algorithm configured to compute differences between the received stereo images and stores the differences as a third disparity map;
comparing the third disparity map to at least a portion of the scaled kernel image to identify pixels of the stereo images that represent the physical foreground object; and
providing the identified pixels that represent the physical foreground object to at least one of a two dimensional and a three dimensional game.

17. The computer readable storage device of claim 16, the identified pixels forming borders that correspond to, with at least pixel level accuracy, physical profiles of the physical foreground object.

18. The computer readable storage device of claim 17, the comparison of the third disparity map to at least a portion of the scaled kernel image configured to identify the pixels for any physical background comprising arbitrary and substantially non-uniform colors.

19. The computer readable storage device of claim 17, one or more borders having a portion corresponding to a portion of the physical foreground object that only partially obscures a portion of the physical background that has a same color as the obscuring portion of the physical foreground object.

20. The computer readable storage device of claim 16, the foreground/background separation algorithm comprising obtaining a stereo-match likelihood and fusing it with a contrast-sensitive color model.

21. The computer readable storage device of claim 16, the game comprising a 3d virtual reality, and a model in the 3d virtual reality is at least one of moved and reoriented in accordance with changes in at least one of location and orientation of the physical foreground object as determined based on the identified pixels representing the physical foreground object.

22. The computer readable storage device of claim 16, the method comprising using the identified pixels to determine at least one of a 3d location and an orientation of the physical foreground object relative to the stereo camera that provided the stereo images and at least one of locating and orienting a 3d model in accordance with at least one of the 3d location and the orientation of the physical foreground object.

23. The computer readable storage device of claim 16, comprising, based upon the identified pixels, mapping motions of the physical foreground object to predefined commands used to control the game.

24. The computer readable storage device of claim 16, depth values are determined based upon the comparison and are used for controlling the game.

25. The computer readable storage device of claim 24, the depth values are used to control at least one of movement and orientation of at least one of a model and a viewpoint in the game.

26. The computer readable storage device of claim 16, the apparatus comprises a game console.

27. A computer comprising a microprocessor configured to execute a method stored on a computer readable storage device, the method comprising:
receiving stereo images of a captured scene with a physical foreground object and a physical background;
using a first disparity map to generate a kernel image, the kernel image comprising an array of pixel values representing a stereo disparity of an object to be located;

scaling the kernel image using a second disparity map, the scaling based on at least a distance of a corresponding portion of the object relative to a stereo camera that provided the stereo images;

performing, in real-time, a foreground/background separation algorithm on the stereo images, the separation algorithm configured to compute differences between the received stereo images and store the differences as a third disparity map;

comparing the third disparity map to at least a portion of the scaled kernel image to identify pixels of the stereo images that represent the physical foreground object; and providing the identified pixels that represent the physical foreground object to at least one of a two dimensional and a three dimensional game.

* * * * *

UNITED STATES PATENT AND TRADEMARK OFFICE
CERTIFICATE OF CORRECTION

PATENT NO.         : 8,094,928 B2                                    Page 1 of 1
APPLICATION NO.    : 11/272950
DATED              : January 10, 2012
INVENTOR(S)        : Thore KH Graepel et al.

It is certified that error appears in the above-identified patent and that said Letters Patent is hereby corrected as shown below:

In column 10, line 53, in Claim 1, after "configured" insert -- to --.

In column 10, line 54, in Claim 1, delete "stores" and insert -- store --, therefor.

In column 12, line 6, in Claim 16, delete "stores" and insert -- store --, therefor.

Signed and Sealed this
Twentieth Day of March, 2012

David J. Kappos
*Director of the United States Patent and Trademark Office*